(12) United States Patent
Becker

(10) Patent No.: US 6,585,779 B1
(45) Date of Patent: Jul. 1, 2003

(54) METHOD AND APPARATUS FOR DETERMINING AND CATEGORIZING JAVA BEAN NAMES AND SUB-ELEMENTS FILES

(75) Inventor: Craig Henry Becker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 795 days.

(21) Appl. No.: 08/974,838

(22) Filed: Nov. 20, 1997

(51) Int. Cl.[7] .......... G06F 15/00; G06F 17/00; G06F 7/00
(52) U.S. Cl. .......... 715/531; 715/501.1; 707/102
(58) Field of Search .......... 707/2, 101, 204, 707/531, 102, 3, 203; 345/357; 395/710; 715/531, 501.1; 704/2

(56) References Cited

U.S. PATENT DOCUMENTS

| | | | |
|---|---|---|---|
| 5,410,475 A | | 4/1995 | Lu et al. |
| 5,490,061 A | * | 2/1996 | Tolin et al. .......... 704/2 |
| 5,615,112 A | | 3/1997 | Liu Sheng et al. |
| 5,630,121 A | | 5/1997 | Braden-Harder et al. |
| 5,721,929 A | * | 2/1998 | Pasquariello .......... 395/710 |
| 5,806,061 A | * | 9/1998 | Chaudhuri et al. .......... 707/3 |
| 5,819,261 A | * | 10/1998 | Takahashi et al. .......... 707/3 |
| 5,848,418 A | * | 12/1998 | De Souza et al. .......... 707/102 |
| 5,857,205 A | * | 1/1999 | Roth .......... 707/203 |
| 5,877,766 A | * | 3/1999 | Bates et al. .......... 345/357 |
| 5,878,410 A | * | 3/1999 | Zbikowski et al. .......... 707/2 |

OTHER PUBLICATIONS

WinZip, Version 6.2, Nico Mak Computing, Inc.—screenshots and help files from application, pp. 1–8, 1996.*
Mark. R. Brown, Using Netscape 2, Que Corporation, pp. 581–583, 1995.*
"A Component Architecture for Java", (by Sun Microsystems), Computer Reseller News, CMP Publications, pp. 1–9, Oct. 1996.*

* cited by examiner

Primary Examiner—Joseph H. Feild
Assistant Examiner—William L. Bashore
(74) Attorney, Agent, or Firm—David A. Mims, Jr.

(57) ABSTRACT

A method and apparatus for determining the names of Java Beans and for categorizing Java Bean sub-elements files. A two stage process is utilized for Java files having one or more .class files and .ser (serialized) files. The first stage attempts to determine the name of a Java Bean based upon the file names forming the Bean based upon suffixes and strings within the file names. The second stage is then applied to determine the category of the Bean sub-elements using the names of the Java Bean derived in the first stage. The first stage names are again examined based upon unique suffixes and word strings and the proper category determined for each file name.

18 Claims, 9 Drawing Sheets

METHOD AND APPARATUS FOR DETERMINING AND CATEGORIZING JAVA BEAN NAMES AND SUB-ELEMENTS FILES

FIELD OF THE INVENTION

The present invention relates to data processing systems, and more particularly, to determining the contents of a Java Repository containing Java Beans.

BACKGROUND OF THE INVENTION

Over the past few years, constructing applications by assembling reusable software components has emerged as a highly productive and widely accepted way to develop custom applications. First generation products such as Microsoft's Visual Basic and Borland's Delphi, have been followed by a wave of new products which have enhanced the basic component assembly application development model by adding more powerful data access components, and object-oriented component extension capabilities. Java, manufactured by the Sun Microsystems, Inc., has quickly established itself as the industry-standard platform for building fully portable Internet and corporate Internet applets and applications. The Java platform provides a number of advantages to developers which include a fully portable platform, a powerful and compact environment, and a network aware platform. Java's language, libraries and virtual machines occupy an ever increasing presence in browsers which allows developers to write application functionality once, and deploy the application broadly on a wide variety of operating systems and hardware platforms. The Java platform provides developers with the full power of an object-oriented language while eliminating the complexity, housekeeping and heavier weight object creation and registration processes required by other language and programming model environments. Java's lightweight runtime is easily incorporated into chips for embedded systems, such as PDAs as well as client and server class Personal Computers (Pcs) and workstations. Security mechanisms are provided which allow full protection against applet interference with client-side data. The platform allows applets to be built from self-describing classes, which are easily downloaded to the client environment without the need for heavy weight installation or registration processes. The recent release of Sun Microsystems Inc.'s Java Beans takes the component software assembly paradigm to a new level.

Java Beans is an architecture and platform neutral Application Programming Interface (API) for creating and using dynamic Java components. Java Beans builds on the strengths of the component assembly development model. It allows developers to define independent components that can be used and re-used in a variety of combinations to compose new applications inside a variety of browser and non-browser environments. Java Beans components can be Graphical User Interface (GUI) widgets, non-visual functions and services, applets and more full-scale applications. Each of these components can be built by different developers at separate times. The components do not need to be part of the same application build but are capable of communicating dynamically.

The Java Beans API is designed for scaling up from simpler, lighter weight, widgets and applets toward more full function applications. This is in stark contrast to existing component model APIs which scale down from complex heavyweight application size components to include lighter-weight widget size components. Consequently, the Java Beans API will not overburden the smaller widget and applet size components with complexity and weight. Java Beans are frequently transmitted in Java Archive (JAR) file format which is a platform-independent file format that aggregates many files into one. Multiple Java applets and their requisite components (.class files, images, sounds and other data) are bundled in a JAR file and subsequently downloaded to a browser in a single HyperText Transfer Protocol (HTTP) transaction, which greatly improves the download speed. The JAR format also supports compression, which reduces the file size, further improving the download time.

In development environments, JAR files are frequently received containing a plurality of Java Beans with minimal or no information about the Java Beans within the JAR file. The technique for determining the contents of these JAR file requires an introspection step followed by instantiation of each Java Bean. Introspection is the process that Java uses to discover the properties, methods and events of a component. The introspection step is followed by creating an instance of each Java Bean. These steps require significant execution time and thus reduce the efficiency of programmers.

Consequently, it would be desirable to provide a method and apparatus for determining the contents of a Java Archive file without requiring introspection and instantiation of the Java Beans stored therein.

SUMMARY OF THE INVENTION

This invention relates to a method and apparatus for determining the names of Java Beans and for categorizing Java Bean sub-element files. A two stage process is disclosed for Java files having one or more class files and ser (serialized) files. The first stage attempts to determine the name of a Java Bean based upon the file names forming the Bean. Each file name is first analyzed to determine if it ends with a .ser, .class, .java, .gif, or .jpg suffix. If a particular suffix is found, the file name undergoes an additional examination for a string equaled to "Exception", "Customizer", "Bean", "BeanInfo" or "Icon". The first stage produces a determination of each of the Java file names. The second stage is then applied to determine the category of the Bean sub-elements using the name of the Java Bean derived in the first stage. The first stage names are again examined for the .class, .ser, .java, .gif, or .jpg suffixes. After determining the proper suffix, the names are again searched for the strings "Exception", "Customizer", "Bean", "BeanInfo", etc. to determine the category for the sub-element file.

DETAILED DESCRIPTION OF THE EMBODIMENTS

This invention provides a method and apparatus for a determining the name of a Java Bean and for categorizing Java Bean sub-element files. The invention provides developers with a quick, efficient mechanism for determining the contents of a Java Archive (JAR) file containing a plurality of Java Beans, but which contains minimal or no information about the Java Beans contained within the JAR file. A Java Bean consists of one or more .class files (e.g., compiled Java code) and perhaps a serialized (.ser) Java class file. One of these files contains the "main" method which is invoked to execute the Bean. Zero or more of these files contains graphics format files that contains icons representing the Bean. An optional file may contain the BeanInfo class for the Bean. In addition, there are other specialized types of files that provide a Customizer class, or source code. It is very difficult to determine which file belongs to which category when the information is not explicitly stated for a JAR repository containing a plurality of Java Beans.

Figure 1:
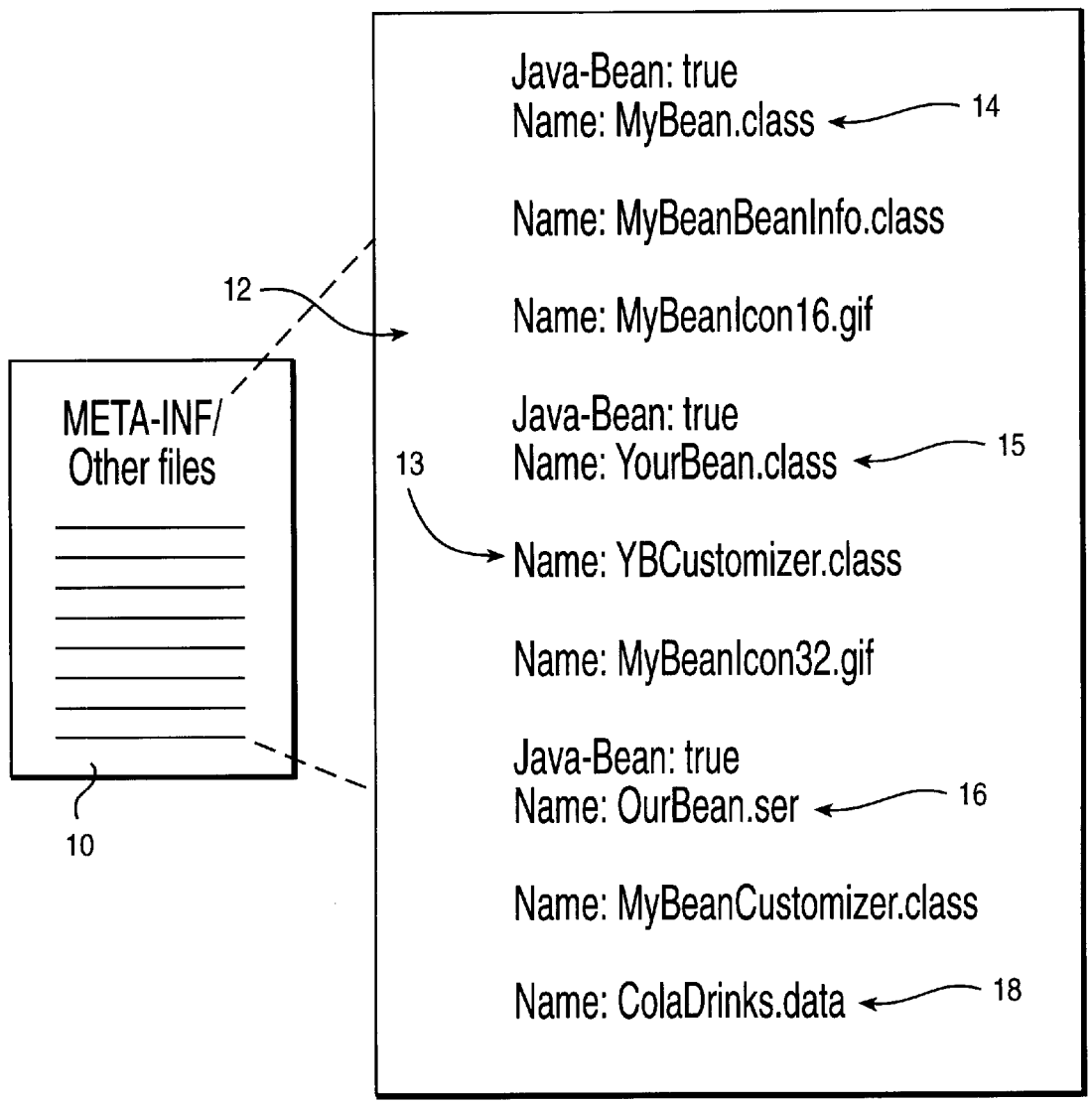
FIG. 1 illustrates Java Beans stored in a Java Beans Archive (JAR) file.

Referring to FIG. 1, there is shown a sample plain Manifest file 10 for a prior art Java Archive (JAR) file. The Manifest file 12 contains three Java Beans which have been designated MyBean 14, YourBean 15 and OurBean 16. The OurBean 16 Java Bean utilizes ColaDrinks.data 18 and the YourBean 15 Java Bean has as a sub-element YBCustomizer.class 13. In general, sub-elements containing the name of the Java Bean or located under a Java Bean are utilized by that Bean. One skilled in the art will appreciate that a JAR file/repository may contains a plurality of Java Beans forming an applet or application program.

This invention uses a two step procedure for determining the names of Java Beans in a repository and categorizing the Java Bean sub-elements files. The first step attempts to guess the name of the Java Bean in a repository. The second step utilizes the name obtained in the first step to categorize the Java Bean sub-element files. The procedure places each file into one of the following Java categories:

OtherFile

OtherClass

ExceptionClass

BeanCustomizerClass

BeanClass

BeanInfoClass

OtherSer

BeanSer

OtherSrc

ExceptionSrc

BeanCustomizerSrc

BeanSrc

Image

BeanIcon

Figure 2:
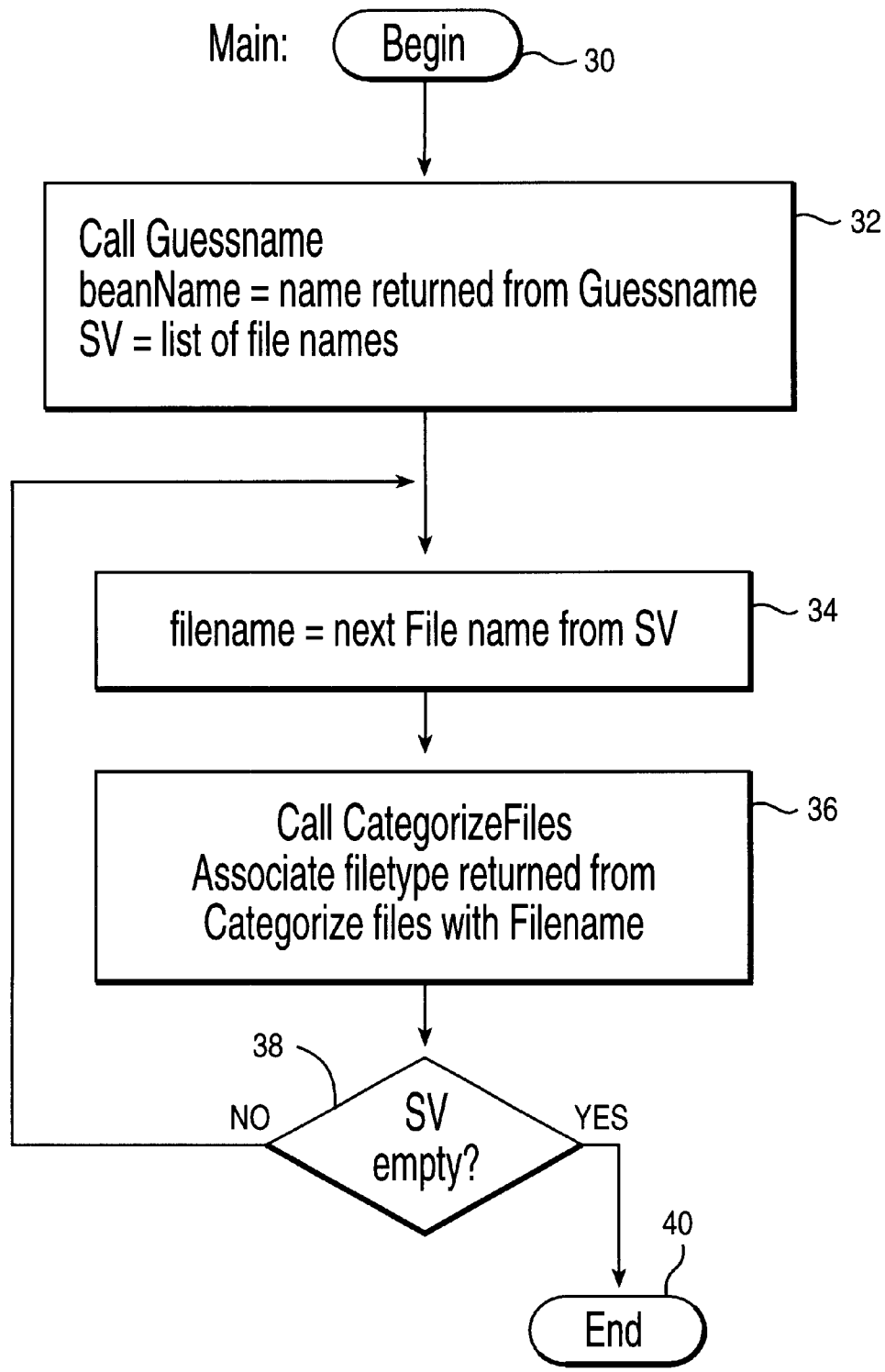
FIGS. 2–7 are flow diagrams of the procedure used to determine the names and categorize plurality of Java Beans as disclosed by this invention.

Referring to FIG. 2, there is shown a flow diagram for the "Main" procedure for determining the names and categorizing a Java Bean. The "Main" procedure starts at block 30 and proceeds immediately to block 32 where the procedure Guessname, used to guess the name of the Bean is called. The bean Name is set equal to the name returned from Guessname and the list of filenames is set equal to SV. At block 34 the procedure sets the next file name from SV equal to the Filename. The CategorizeFile procedure is called at block 36 and associates the Filetype returned from CategorizeFile with Filename. At block 38, the procedure checks if SV is empty. If YES, processing ends at block 40. Else, processing returns to block 34.

Figure 3:
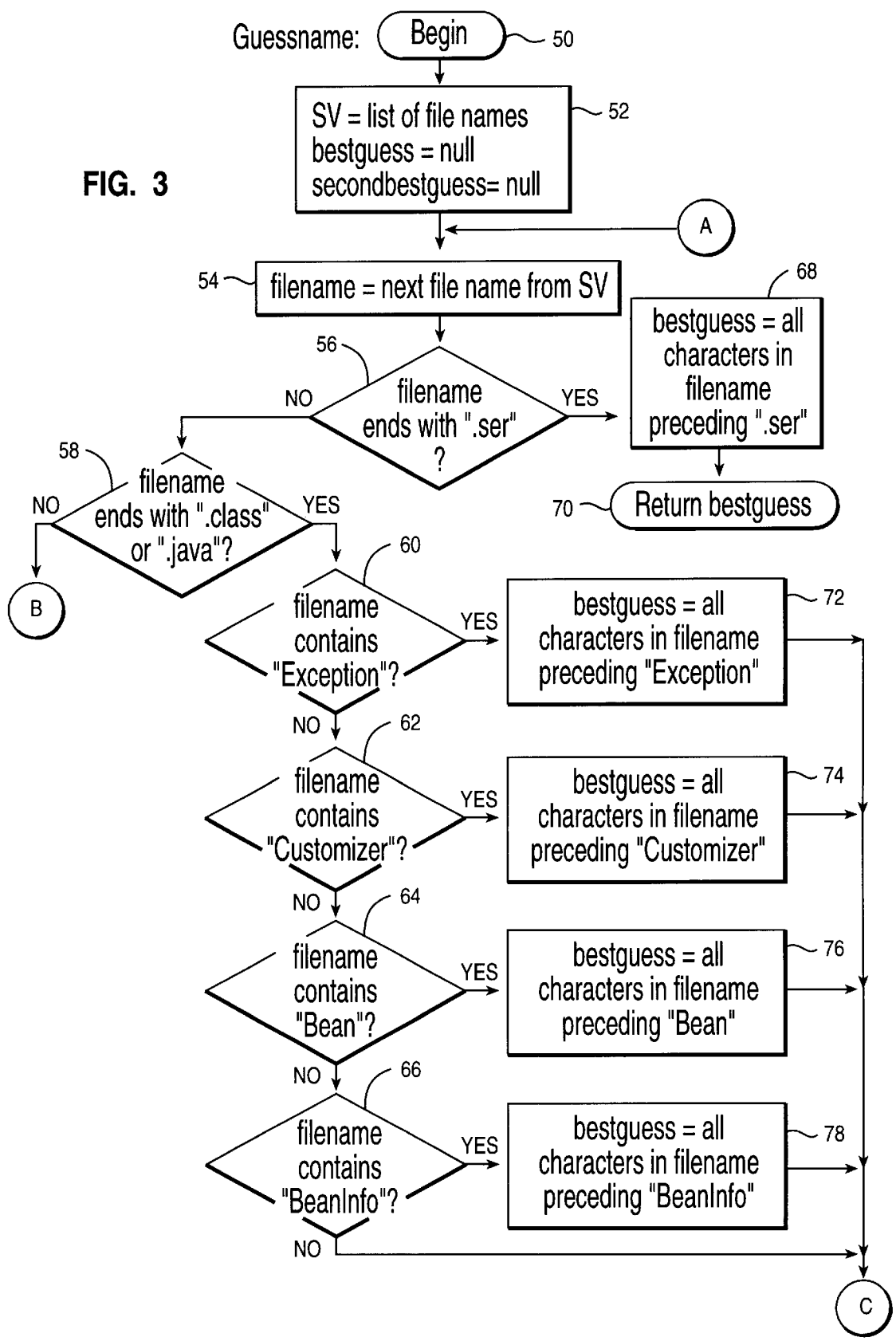
Figure 4:
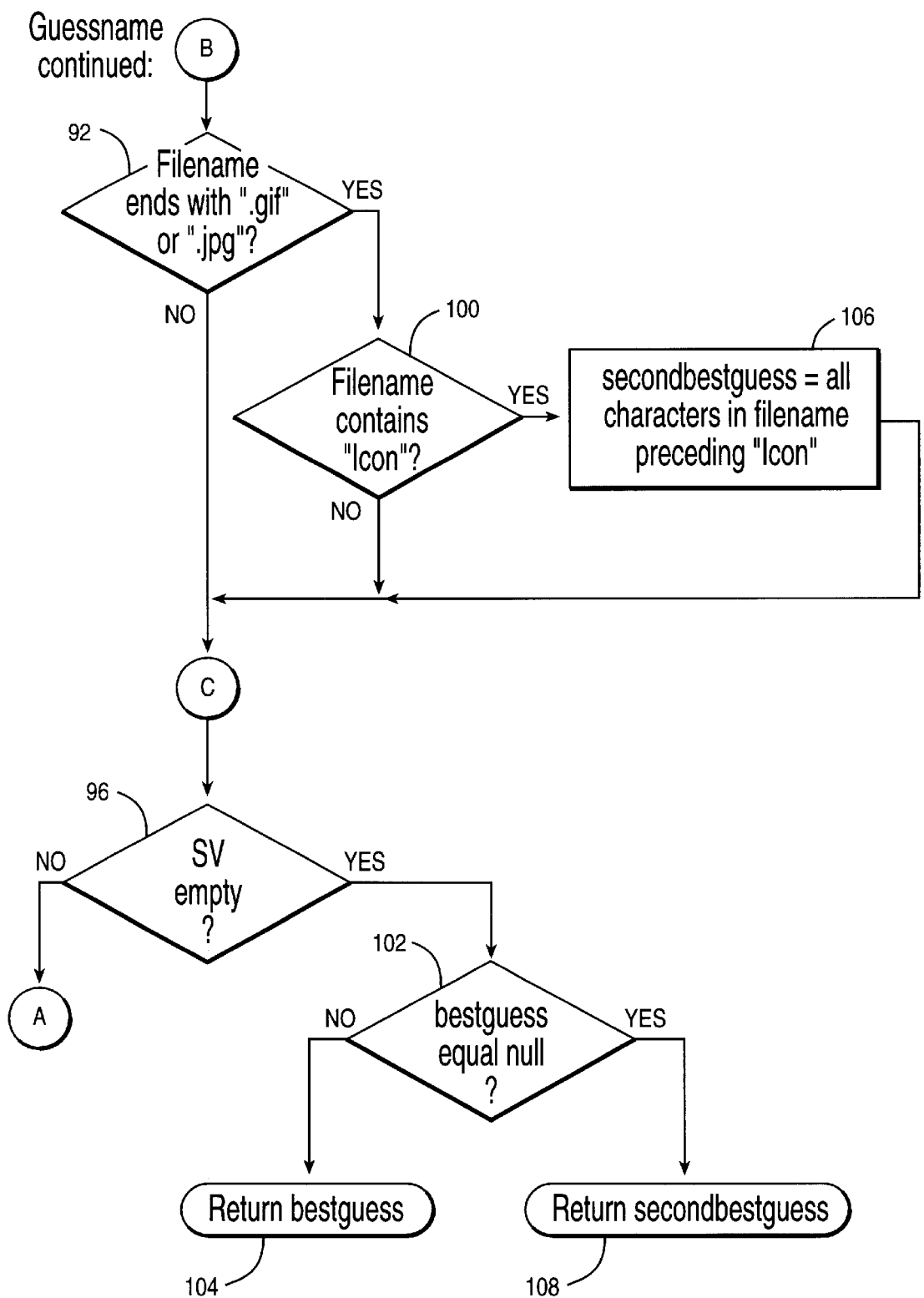

Referring to FIG. 3, details of the GuessName procedure described in block 32 of FIG. 2 will now be described. The procedure begins at block 50 and proceeds to block 52 where the list of file names is set equal to SV. In addition, both best guess and Secondbestguess are set equal to null. At block 54, Filename is set equal to the next file name from SV. A check is conducted at block 56 to determine if Filename ends with ".ser". If YES, bestguess is set equal to all characters in Filename preceding ".ser" at block 68 and bestguess is returned at block 70. If NO at block 56, a check is conducted to determine if Filename ends with ".class" or "java" at block 58. If YES, a determination is made at block 60 whether Filename contains the string "exception". If YES, at block 72 bestguess is set equal to all characters in Filename preceding "Exception". If NO at block 60, the procedure checks at block 62 to determine if Filename contains "Customizer". If "Customizer" is found within Filename, processing continues to block 74 where bestguess is set equal to all characters in Filename preceding "Customizer". If the string "Customizer" is not found at block 62, processing proceeds to block 64 where the Filename is checked for "Bean". If found, processing proceeds to block 76 where bestguess is set equal to all characters in Filename preceding "Bean". If Filename does not contain a "Bean" string at block 64, processing continues at block 66 where a check is done to determine if Filename contains the string "BeanInfo". If YES, at block 78 bestguess is set equal to all characters preceding "BeanInfo". If NO at block 66, processing continues at block 96 (FIG. 4). Returning to block 58, if Filename does not end with ".class" or ".java", a check is conducted at block 92 (FIG. 4) to determine if Filename ends with ".gif" or ".jpg". If YES, a determination is made at block 100 to determine if Filename contains "Icon". If YES, at block 106 second bestguess is set equal to all characters in Filename preceding "Icon". Else, processing continues at block 96 to determine if the list SV is empty. If SV is not empty at block 96, processing returns to block 54 (FIG. 3) to process the next Filename. Returning to block 96, if SV is empty, a determination is made at block 102 whether bestguess equals null. If YES, the procedure returns secondbestguess at block 108. Else, at block 104 the procedure returns bestguess.

Figure 5:
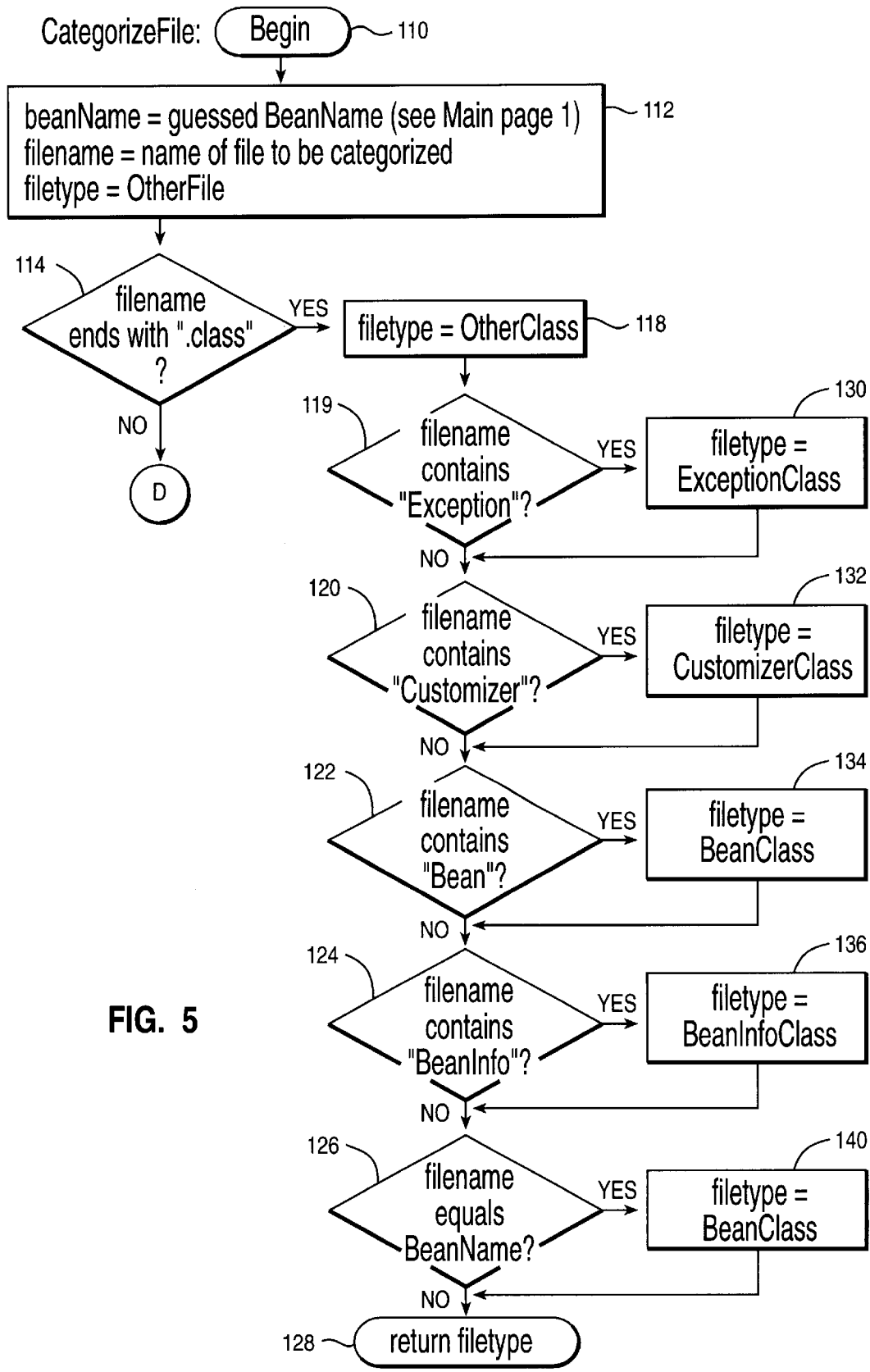

Referring to FIG. 5, the procedure CategorizeFile shown in the "Main" procedure at block 36 (FIG. 2) will be described. The procedure begins at block 110 and proceeds immediately to block 112 where bean Name is set equal to the guessed Bean Name. Filename is set equal to the name of the file to be categorized and Filetype is set equal to OtherFile. At block 114 a determination is made whether Filename ends with ".class". If YES, filetype is set equal to OtherClass at block 118. At block 119, a check is made whether Filename contains the string "exception". If Yes, Filetype is set equal to ExceptionClass at block 130. Else, at block 120 a check is conducted to determine if Filename contains the string "Customizer". If YES, the Filetype is set equal to CustomizerClass as shown at block 132. Else, at block 122 the Filename is checked for the string "Bean". If YES, at block 134 Filetype is set equal to BeanClass. Else, at block 124 File name is checked for the name "BeanInfo". If found, at block 136 Filetype is set equal to BeanInfoClass. Else, at block 126 a test is conducted for the string "BeanName". If YES, Filetype is set equal to BeanClass as shown in block 140. If NO, at block 128 the procedure returns Filetype. Returning to block 114, if Filename does not end with ".class", processing continues at block 144 (FIG. 6).

Figure 6:
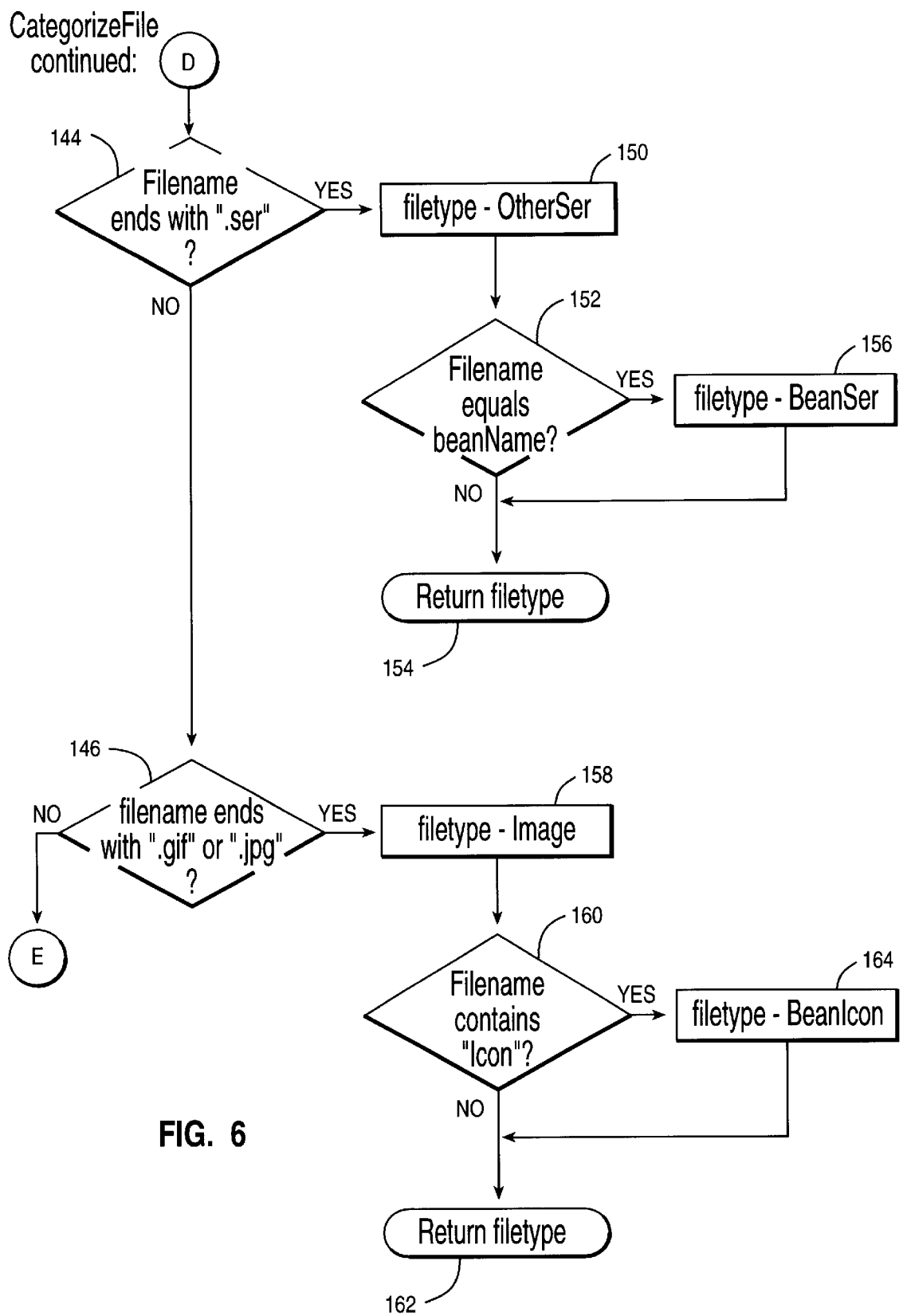

Referring now to FIG. 6, the procedure checks Filename for ".ser" at block 144. If found, at block 150 File type is set equal to OtherSer. At block 152 a determination is made whether Filename equals Bean Name. If YES, at block 156 Filetype is set equal to BearSer. Else, at block 154 the procedure returns Filetype. Returning to block 144, if File name does not end with ".ser", the File name is checked at block 146 for .gif or .jpg. If either is found, Filetype is set equal to Image at block 158, and processing proceeds to block 160 where a check is conducted to determine if Filename contains "Icon". If YES, Filetype is set equal to BeanIcon as shown at block 164. If NO, at block 162 the procedure returns Filetype. Returning to block 146, if ".gif" or ".jpg" are not found, processing continues at block 172 (FIG. 7)

Figure 7:
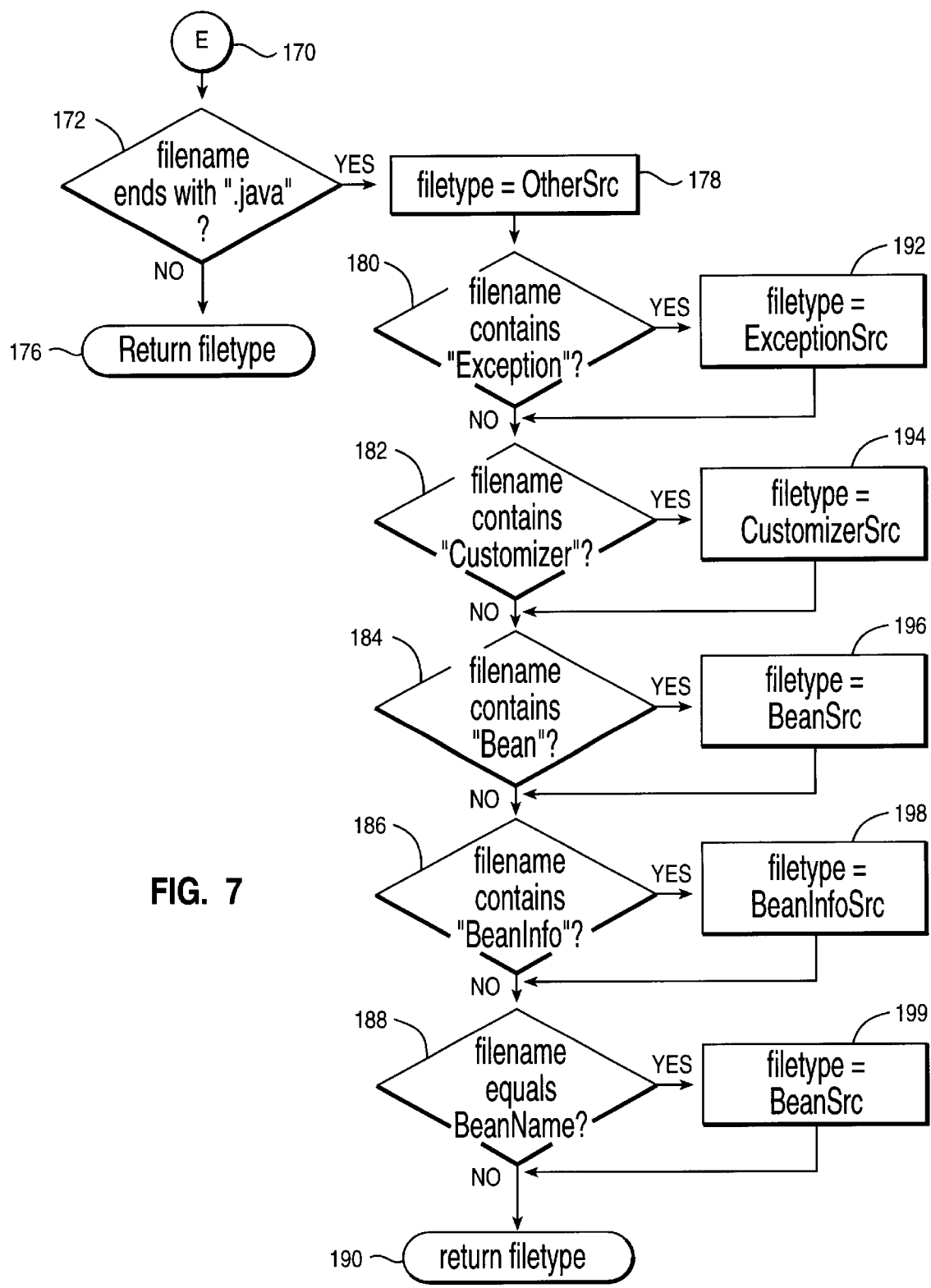

Referring to FIG. 7, at block 172 a determination is made whether Filename ends with ".java". If NO, the procedure returns Filetype at block 176. Else, at block 178 Filetype is set equal to OtherSrc. A check is conducted at block 180 to determine whether Filename contains the string "exception". If YES, at block 192 Filetype is set equal to ExceptionSrc. If NO at block 180, the procedure checks at block 182 to determine if Filename contains "Customizer". If "Customizer" is found within the Filename, processing continues to block 194 where Filetype is set equal CustomizerSrc. If the string "Customizer" is not found at block 182, processing proceeds to block 184 where Filename is checked for "Bean". If found, processing proceeds to block 196 where Filetype is set equal to BeanSrc. If Filename does not contain a "Bean" string at block 184, processing continues at block 186 where a check is done to determine if Filename contains the string "BeanInfo". If YES, at block 198 Filetype is set equal to BeanInfoSrc. If NO at block 186, processing continues at block 188 to determine if Filename equals beanName. If YES, Filetype is set equal to BeanSrc at block 199. Else, the procedure returns FileType at block 190.

Figure 8:
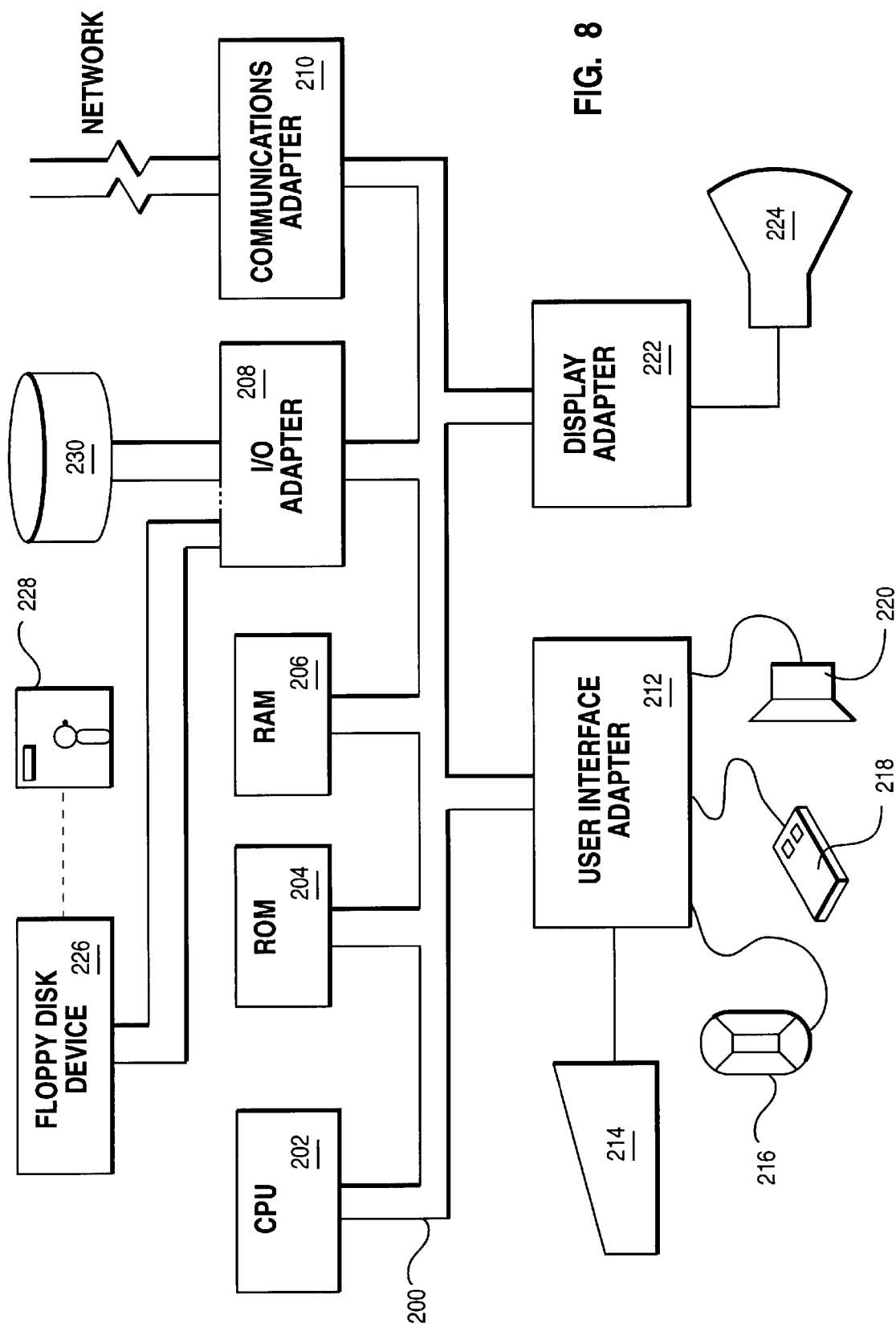
FIG. 8 illustrates a computer/workstation where this invention may be practiced.

Referring now to FIG. 8, there is shown a pictorial representation of a workstation, having a central processing unit 202, such as a conventional microprocessor, and a number of other units interconnected via a system bus 200. The workstation shown in FIG. 8, includes a Random Access Memory (RAM) 206, Read Only Memory (ROM) 204, an I/O adapter 208 for connecting peripheral devices such as floppy disk unit 226 to the bus, a user interface adapter 212 for connecting a keyboard 214, a mouse 218, a speaker 220, a microphone 216, and/or other user interface devices such as a touch screen device (not shown) to the bus, a communication adapter 210, for connecting the workstation to a data processing network and a display adapter 224, for connecting the bus to a display device 224. The workstation, in the preferred embodiment, has resident thereon the computer software making up this invention, which may be loaded from diskette 228.

Figure 9:
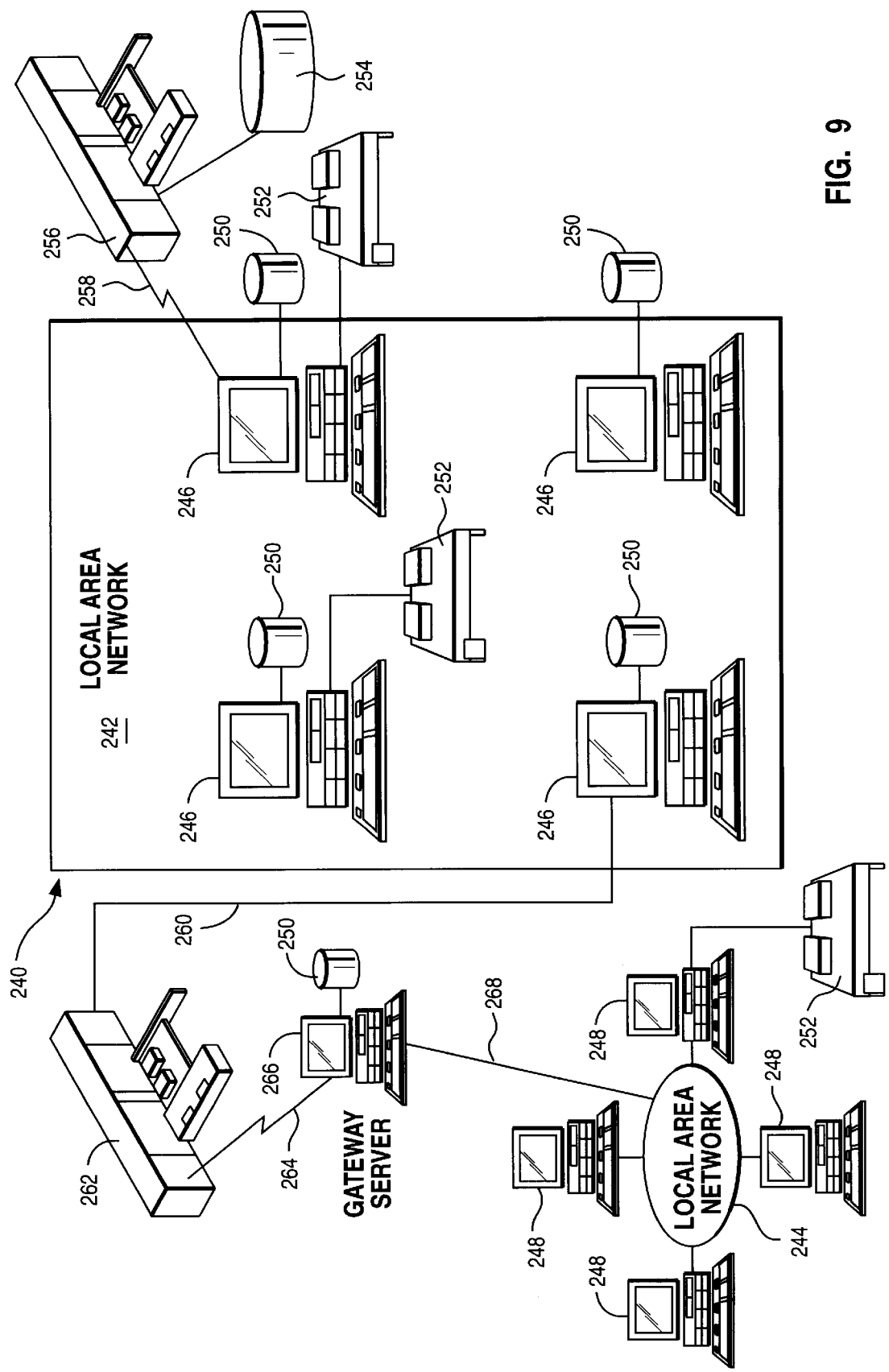
FIG. 9 is an illustrative embodiment of a computer network where the present invention may be practiced.

A representative network environment where this invention may be practiced is depicted in FIG. 9, which illustrates a pictorial representation of a distributed data processing system 240. As illustrated, data processing system 240 contains a plurality of networks, including local area networks (LAN) 242 and 244, each of which preferably includes a plurality of individual computers 246 and 248, respectively as shown in FIG. 8. One skilled in the art will appreciate that a plurality of workstations coupled to a host processor may be utilized for each such network. As is common in such data processing systems, each computer 246 and 248, may be coupled to a storage device 250, and a printer 252.

Data processing system 240 further includes one or more mainframe computers, such as mainframe computer 256, which may be preferably coupled to LAN 242 by means of a communication link 260. Mainframe computer 256 is preferably coupled to a storage device 254, which serves as remote storage for LAN 242. LAN 242 is also coupled via communications link 260 through communications controller 262 and communications link 264 to gateway server 266.

Gateway server 266 is preferably a workstation which serves to link LAN 242 to LAN 244 via communications link 268. As understood by one skilled in the art, data processing system 240 additionally includes unillustrated gateways, routers, bridges, and various other network hardware utilized to interconnect the segments of data processing system 240.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

I claim:

1. A method, implemented in a computer system, for determining a category for a plurality of object-oriented objects in a repository in said computer system, comprising the steps of:

inputting an unknown list of file names for said plurality of objects in said repository in said computer system;

reading said unknown list of file names and examining each for a unique suffix and word string to create a second list based upon said unique suffix and said word string;

examining said second list and determining said category for each of the file names based upon said unique suffix and a different word string.

2. The method of claim 1 wherein said step of inputting a list of file names further comprises:

providing said plurality of object-oriented objects as Java Beans having one or more class and serialized files in said computer.

3. The method of claim 1 wherein said step of reading said list of file names further comprises:

detecting a class file as said unique suffix and examining said file names for said word string associated with said class file.

4. The method of claim 1 wherein said step of reading said list of file names further comprises:

detecting a serialized file as said unique suffix and examining each of said file names for said word string associated with said serialized file.

5. The method of claim 1 wherein said step of examining said second list further comprises:

detecting a class file as said suffix in said file name and examining the file name for said different word string associated with said class file.

6. The method of claim 1 wherein said step of examining said second list further comprises:

detecting a serialized file as said suffix in said file name and examining the file name for said different word string associated with said serialized file.

7. An apparatus for determining a category for a plurality of object-oriented objects in a repository in said computer system, comprising:

means for inputting an unknown list of file names for said plurality of objects in said repository in said computer system;

means for reading said unknown list of file names and examining each for a unique suffix and word string to create a second list based upon said unique suffix and said word string; and means for examining said second list and determining said category for each of the file names based upon said unique suffix and a different word string.

8. The apparatus of claim 7 wherein said means for inputting a list of file names further comprises:

means for providing said plurality of object-oriented objects as Java Beans having one or more class and serialized files in said computer.

9. The apparatus of claim 7 wherein said means for reading said list of file names further comprises:

means for detecting a class file as said unique suffix and examining said file names for said word string associated with said class file.

10. The apparatus of claim 7 wherein said means for reading said list of file names further comprises:

means for detecting a serialized file as said unique suffix and examining each of said file names for said word string associated with said serialized file.

11. The apparatus of claim 7 wherein said means for examining said second list further comprises:

means for detecting a class file as said suffix in said file name and examining the file name for said different word string associated with said class file.

12. The apparatus of claim 7 wherein said means for examining said second list further comprises:

means for detecting a serialized file as said suffix in said file name and examining the file name for said different word string associated with said serialized file.

13. A computer program product having a computer readable medium having computer program logic recorded thereon for determining a category for a plurality of object-oriented objects in a repository in said computer system, comprising:

computer readable means for inputting an unknown list of file names for said plurality of objects in said repository in said computer system;

computer readable means for reading said unknown list of file names and examining each for a unique suffix and word string to create a second list based upon said unique suffix and said word string; and computer readable means for examining said second list and determining said category for each of the file names based upon said unique suffix and a different word string.

14. A computer program product of claim 13 wherein said computer readable means for inputting a list of file names further comprises:

computer readable means for providing said plurality of object-oriented objects as Java Beans having one or more class and serialized files in said computer.

15. A computer program product of claim 13 wherein said computer readable means for reading said list of file names further comprises:

computer readable means for detecting a class file as said unique suffix and examining said file names for said word string associated with said class file.

16. A computer program product of claim 13 wherein said computer readable means for reading said list of file names further comprises:

computer readable means for detecting a serialized file as said unique suffix and examining each of said file names for said word string associated with said serialized file.

17. A computer program product of claim 13 wherein said computer readable means for examining said second list further comprises:

computer readable means for detecting a class file as said suffix in said file name and examining the file name for said different word string associated with said class file.

18. A computer program product of claim 13 wherein said computer readable means for examining said second list further comprises:

means for detecting a serialized file as said suffix in said file name and examining the file name for said different word string associated with said serialized file.

* * * * *